United States Patent
Hwang et al.

(10) Patent No.: US 10,346,799 B2
(45) Date of Patent: *Jul. 9, 2019

(54) SYSTEM TO CATALOGUE TRACKING DATA

(71) Applicant: Palantir Technologies Inc., Palo Alto, CA (US)

(72) Inventors: Deborah Hwang, Arlington, VA (US); Daniel Lidor, Washington, DC (US); William Rhyne, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,041

(22) Filed: Jul. 17, 2018

(65) Prior Publication Data

US 2018/0322451 A1 Nov. 8, 2018

Related U.S. Application Data

(63) Continuation of application No. 15/269,685, filed on Sep. 19, 2016, now Pat. No. 10,068,199.

(Continued)

(51) Int. Cl.
*G06Q 10/00* (2012.01)
*G06Q 10/08* (2012.01)
*H04W 4/02* (2018.01)

(52) U.S. Cl.
CPC ....... *G06Q 10/087* (2013.01); *G06Q 10/0833* (2013.01); *H04W 4/02* (2013.01)

(58) Field of Classification Search
CPC ..................................................... G06Q 10/00

(Continued)

(56) References Cited

U.S. PATENT DOCUMENTS 4,899,161 A 2/1990 Morin, Jr. et al.
4,958,305 A 9/1990 Piazza
(Continued)

FOREIGN PATENT DOCUMENTS

AU 2012216622 5/2015
DE 102013222023 A1 1/2015
(Continued)

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.

(Continued)

*Primary Examiner* — Russell S Glass
(74) *Attorney, Agent, or Firm* — Schwegman Lundberg & Woessner, P.A.

(57) ABSTRACT

Aspects of the present disclosure involve a data audit system to generate and cause display of a tracking interface at a client device, wherein the tracking interface is configured to facilitate the visualization of tracking data retrieved from multiple sources. The audit system is configured to access a data source to retrieve tracking data that includes an associated asset identifier that identifies a subject of the tracking data, to link the retrieved tracking data to a data object at a database of the audit system based on the asset identifier, and to generate and cause display of a visualization of the tracking data within a tracking interface.

20 Claims, 10 Drawing Sheets

Related U.S. Application Data

(60) Provisional application No. 62/336,096, filed on May 13, 2016.

(58) Field of Classification Search
USPC .......................................................... 705/28
See application file for complete search history.

(56) References Cited

U.S. PATENT DOCUMENTS

| | | |
|---|---|---|
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen |
| 7,375,732 B2 | 5/2008 | Arcas |
| 7,379,811 B2 | 5/2008 | Rasmussen et al. |
| 7,457,706 B2 | 11/2008 | Melero |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod |
| 7,620,628 B2 | 11/2009 | Kapur et al. |
| 7,663,621 B1 | 2/2010 | Allen |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskalns |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle et al. |
| 8,368,695 B2 | 2/2013 | Howell et al. |
| 8,397,171 B2 | 3/2013 | Klassen et al. |
| 8,400,448 B1 | 3/2013 | Doyle |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy, Sr. et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 10,068,199 B1 * | 9/2018 | Hwang ................ G06Q 10/087 |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Ioup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump et al. |
| 2008/0077642 A1 | 3/2008 | Carbone |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell |
| 2008/0195417 A1 | 8/2008 | Surpin |
| 2008/0223834 A1 | 9/2008 | Griffiths et al. |

(56) References Cited

U.S. PATENT DOCUMENTS

| | | |
|---|---|---|
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg |
| 2014/0060939 A1* | 3/2014 | Eppert .................. E02F 3/342 177/1 |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | WO-9532424 A1 | 11/1995 |
| WO | WO-2000009529 A2 | 2/2000 |
| WO | WO-2001098925 A2 | 12/2001 |
| WO | WO-2004057268 A2 | 7/2004 |
| WO | WO-2005013200 A1 | 2/2005 |
| WO | WO-2008064207 A2 | 5/2008 |
| WO | WO-2009061501 A1 | 5/2009 |
| WO | WO-2009123975 A1 | 10/2009 |
| WO | WO-2011058507 A1 | 5/2011 |

OTHER PUBLICATIONS

"Amm's Diary: Unconnected ways and other data quality issues", Open Street Map, [Online]. Retrieved from the Internet: <URL: http://www.openstreetmap.org/user/amm/diary>, (Accessed: Jul. 23, 2012), 3 pgs.

"U.S. Appl. No. 12/840,673, Final Office Action dated Jan. 2, 2015", 21 pgs.

"U.S. Appl. No. 12/840,673, Non Final Office Action dated Sep. 17, 2014", 21 pgs.

"U.S. Appl. No. 12/840,673, Notice of Allowance dated Apr. 6, 2015", 11 pgs.

"U.S. Appl. No. 13/728,879, Final Office Action dated Aug. 12, 2015", 9 pgs.

"U.S. Appl. No. 13/728,879, First Action Interview Office Action Summary dated Mar. 17, 2015", 5 pgs.

"U.S. Appl. No. 13/728,879, First Action Interview Pre-Interview Communication dated Jan. 27, 2015", 4 pgs.

"U.S. Appl. No. 13/728,879, Non Final Office Action dated Nov. 20, 2015", 9 pgs.

"U.S. Appl. No. 13/728,879, Notice of Allowance dated Jun. 21, 2016", 13 pgs.

"U.S. Appl. No. 13/917,571, Issue Notification dated Aug. 5, 2014", 1 pg.

"U.S. Appl. No. 13/948,859, Notice of Allowance dated Dec. 10, 2014", 8 pgs.

"U.S. Appl. No. 14/289,596, Advisory Action dated Apr. 30, 2015", 3 pgs.

"U.S. Appl. No. 14/289,596, Final Office Action dated Jan. 26, 2015", 38 pgs.

"U.S. Appl. No. 14/289,596, First Action Interview Pre-Interview Communication dated Jul. 18, 2014", 4 pgs.

"U.S. Appl. No. 14/289,596, Non Final Office Action dated May 9, 2016", 37 pgs.

"U.S. Appl. No. 14/289,599, Advisory Action dated Sep. 4, 2015", 24 pgs.

"U.S. Appl. No. 14/289,599, Final Office Action dated May 29, 2015", 8 pgs.

(56) References Cited

OTHER PUBLICATIONS

"U.S. Appl. No. 14/289,599, First Action Interview Pre-Interview Communication dated Jul. 22, 2014", 5 pgs.
"U.S. Appl. No. 14/294,098, Final Office Action dated Nov. 6, 2014", 22 pgs.
"U.S. Appl. No. 14/294,098, First Action Interview Pre-Interview Communication dated Aug. 15, 2014", 17 pgs.
"U.S. Appl. No. 14/294,098, Notice of Allowance dated Dec. 29, 2014", 9 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/490,612, Final Office Action dated Aug. 18, 2015", 71 pgs.
"U.S. Appl. No. 14/730,123, Notice of Allowance dated Apr. 12, 2016", 10 pgs.
"U.S. Appl. No. 14/730,123, Pre-Interview First Office Action dated Sep. 21, 2015", 4 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"U.S. Appl. No. 14/934,004, First Action Interview Pre-Interview Communication dated Feb. 16, 2016", 5 pgs.
"U.S. Appl. No. 15/269,685, First Action Interview—Pre-Interview Communication dated May 19, 2017", 3 pgs.
"U.S. Appl. No. 15/269,685, First Action Interview—Pre-Interview Communication dated Dec. 12, 2016", 3 pgs.
"U.S. Appl. No. 15/269,685, Notice of Allowance dated Apr. 18, 2018", 8 pgs.
"Australian Application Serial No. 2012216622, Office Action dated Jan. 6, 2015", 2 pgs.
"Australian Application Serial No. 2014202442, Office Action dated Mar. 19, 2015", 5 pgs.
"Australian Application Serial No. 2014213553, Office Action dated May 7, 2015", 2 pgs.
"Buffer a Polygon", VBForums, [Online]. Retrieved from the Internet: <URL: http://www.vbforums.com/showthread.php?198436-Buffer-a-Polygon>, (Accessed: Oct. 10, 2016).
"Douglas-Peucker-Algorithms", Wikipedia (W/ Machine Translation), [Online]. [Archived Jul. 29, 2011]. Retrieved from the Internet: <URL: http://de.wikipedia.org/w/index.php?title=Douglas-Peucker-Algorithmus&oldid=91846042">, (Last Modified: Jul. 29, 2011), 4 pgs.
"European Application Serial No. 14187739.9, Extended European Search Report dated Jul. 6, 2015", 9 pgs.
"GIS-NET 3 Public Department of Regional Planning", Planning & Zoning Information for Unincorporated LA County, [Online] Retrieved from the internet: <http://gis.planning.lacounty.gov/GIS-NET3_Public/Viewer.html>, (Oct. 2, 2013), 1-2.
"Great Britain Application Serial No. 1408025.3, Office Action dated Nov. 6, 2014", 3 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"Identify—Definition", Downloaded Jan. 22, 2015, (Jan. 22, 2015), 1 pg.
"Map Builder: Rapid Mashup Development Tool for Google and Yahoo Maps!", http://web.archive.org/web/20090626224734/http://www.mapbuilder.net/, (Jul. 20, 2012), 2 pgs.
"Map of San Jose, CA", Retrieved Oct. 2, 2013 from http://maps.google.com, (Oct. 2, 2013), 1 pg.
"Map of San Jose, CA", Yahoo, [Online] retrieved from the internet: <http://maps.yahoo.com>, (Oct. 2, 2013), 1 pg.
"Map of San Jose, CA.", Retrieved Oct. 2, 2013 from http://maps.bing.com, (Oct. 2, 2013), 1 pg.
"Netherlands Application Serial No. 2011632, Netherlands Search Report dated Feb. 8, 2016", W/ English Translation, 9 pgs.
"Netherlands Application Serial No. 2012778, Netherlands Search Report dated Sep. 22, 2015", W/ English Translation, 10 pgs.
"New Zealand Application Serial No. 628585, Office Action dated Aug. 26, 2014", 2 pgs.
"New Zealand Application Serial No. 628840, Office Action dated Aug. 28, 2014", 2 pgs.
"Overlay—Definition", Downloaded Jan. 22, 2015, (Jan. 22, 2015), 1 pg.
"Ramer-Douglas-Peucker algorithm", Wikipedia, [Online]. [Archived May 31, 2013]. Retrieved from the Internet: <URL: http://en.wikipedia.orglw/index.php?title=Ramer-DouglasPeucker_algorithm&oldid=557739119">, (Jul. 2011), 3 pgs.
"Using the Area of Interest Tools", Sonris, [Online]. Retrieved from the Internet: <URL: http://web.archive.org/web/20061001053327/http://sonris-www.dnr.state.la.us/gis/instruct_files/tutslide12.htm>, (Oct. 1, 2006), 1 pg.
Aquino, J., et al., "JTS Topology Suite: Technical Specifications", Vivid Solutions, Technical Specifications Version 1.4, (Oct. 17, 2003), 1-36.
Barnes, Diane, et al., "Viewshed Analysis", GIS—ARC/INFO, (2001), 1-10.
Barto, "How to: Create Your Own Points of Interest", How to, [Online]. Retrieved from the Internet: <URL:http://www.poieditor.com/articles/howto_create_your_own_points_of_interest/>, (Jul. 22, 2008), 4 pgs.
Carver, Steve, et al., "Real-time visibility analysis and rapid viewshed calculation using a voxel-based modelling approach", (Apr. 13, 2012), 6 pgs.
Chen, et al., "Bringing Order to the Web: Automatically Categorizing Search Results", Proceedings of the SIGCHI conference on Human Factors in Computing Systems, The Hague, The Netherlands, (2000), 145-152.
Dramowicz, Ela, "Retail Trade Area Analysis Using the Huff Model", Directions Magazine [Online] retrieved from the Internet: <http://www.directionsmag.com/articles/retail-trade-area-analysis-usinq-the-huff-model/123411>, (Jul. 2, 2005), 10 pgs.
Ghosh, Pijush K, "A Solution of Polygon Containment, Spatial Planning, and Other Related Problems Using Minkowski Operations", National Centre for Software Technology, Bombay India, Computer Vision, Graphics, and Image Processing, vol. 49, (Feb. 15, 1989), 35 pgs.
Gorr, et al., "Crime Hot Spot Forecasting: Modeling and Comparative Evaluation", Grant 98-IJ-CX-K005, (May 6, 2002), 37 pgs.
Griffith, Daniel A, et al., "A Generalized Huff Model", Geographical Analysis, vol. 14, No. 2, (Apr. 1982), 135-144.
Haralick, Robert M, et al., "Image Analysis Using Mathematical Morphology", IEE Transactions on pattern analysis and machine intelligence, vol. PAMI-9, (Jul. 4, 1987), 532-550.
Hibbert, et al., "Prediction of Shopping Behavior Using a Huff Model Within a GIS Framework", (Mar. 18, 2011), 16 pgs.
Huang, DA Wei, et al., "Systematic and Integrative Analysis of Large Gene Lists Using DAVID Bioinformatics Resources", Nature Protocols, 4.1, (Dec. 2008), 44-57.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Ipbucker, C, et al., "Inverse Transformation for Several Pseudo-cylindrical Map Projections Using Jacobian Matrix", ICCSA 2009, Part 1 LNCS 5592, (2009), 2 pgs.
Levine, Ned, "Crime Mapping and the Crimestat Program", Geographical Analysis, vol. 38, (2006), 41-56.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Mandagere, Nagapramod, "Buffer Operations in GIS", [Online]. Retrieved from the Internet: <URL: http://www-users.cs.umn.edu/~npramod/enc_pdf.pdf>, (Printed: Jan. 20, 2010), 7 pgs.
Murray, C, "Oracle Spatial Developer's Guide-6 Coordinate Systems (Spatial Reference Systems)", [Online]. Retrieved from the Internet<URL:http://docs.oracle.com/cd/B28359_01/appdev.111/b28400.pdf>, (Jun. 2009), 870 pgs.

(56) References Cited

OTHER PUBLICATIONS

Pozzi, F., et al., "Vegetation and Population Density in Urban and Suburban Areas in the USA", Presented at the Third International Symposium of Remote Sensing of Urban Areas; Istanbul, Turkey, Jun. 2002, (Jun. 2002), 8 pgs.

Qiu, Fang, "3D Analysis and Surface Modeling", Power point presentation, 26 pgs.

Reddy, Martin, et al., "Under the Hood of GeoVRML 1.0", Proceeding VRML '00 Proceedings of the fifth symposium on Virtual reality modeling language (Web3D-VRML), [Online] Retrieved from the internet: <http://pdf.aminer.org/000/648/038/under_the_hood_of_geovrml.pdf>, (Feb. 2000), 23-28.

Reibel, M., et al., "Areal Interpolation of Population Counts Using Pre-Classified Land Cover Data", Popul Res Policy Rev. 26, (Sep. 19, 2007), 619-633.

Reibel, M., et al., "Geographic Information Systems and Spatial Data Processing in Demography: a Review", Popul Res Policy Rev (2007) 26, (Sep. 6, 2007), 601-618.

Rizzardi, M., et al., "Interfacing U.S. Census Map Files With Statistical Graphics Software: Application and Use in Epidemiology", Statistics in Medicine, vol. 12, (1993), 1953-1964.

Snyder, John P, "Map Projections—A Working Manual", U.S. Geological Survey Professional Paper, 1395, (1987), 29 pgs.

Tangelder, J W.H, et al., "Freeform Shape Matching Using Minkowski Operations", (Jun. 1996), 12 pgs.

Thompson, Mick, "Getting Started with GEO", (Jul. 26, 2011), 3 pgs.

Turner, Andy, "Andy Turner's GISRUK 2012 Notes", Google Drive—https://docs.google.com/document/d/1cTmxg7mVx5gd89IqbICYvDEnHA4QAivH417WpyPsqE4edit?pli=1, (Sep. 16, 2013), 1-15.

Valentini, Giorgio, et al., "Ensembles of Learning Machines", Lecture Notes in Computer Science: Neural Nets, Springer Berlin Heidelberg, (Sep. 26, 2002), 3-20.

Wongsuphasawat, Krist, et al., "Visual Analytics for Transportation Incident Data Sets", Transportation Research Record: Journal of the Transportation Research Board, No. 2138, (2009), 135-145.

Woodbridge, Stephen, "[geos-devel] Polygon simplification", [Online]. Retrieved from the Internet<URL:http://lists.osgeo.org/pipermail/geos-devel/2011-May/005210.html>, (May 8, 2011), 2 pgs.

U.S. Appl. No. 15/269,685, U.S. Pat. No. 10,068,199, filed Sep. 19, 2016, System to Catalogue Tracking Data.

\* cited by examiner

US 10,346,799 B2

SYSTEM TO CATALOGUE TRACKING DATA

PRIORITY APPLICATION

This application is a continuation of and claims priority to U.S. patent application Ser. No. 15/269,685, filed on Sep. 19, 2016, which claims priority to U.S. Provisional Patent Application Ser. No. 62/366,096 filed May 13, 2016, the benefit of priority of each of which is claimed hereby, and each of which are incorporated by reference herein in its entirety.

TECHNICAL FIELD

The subject matter disclosed herein relates to tracking systems, and more particularly, to systems and methods for cataloguing and visualizing tracking data received from one or more distinct tracking systems.

BACKGROUND

In the present environment, there is a recognized need for improvements in tracking technologies. For example, the ability to track assets such as packages and shipping containers, as well as wildlife and vehicles becomes increasingly difficult as the number of tracked assets increases. This recognition has resulted in the desire for a diverse suite of tracking tools. While having a broad assortment of diverse tracking tools may prove to be advantageous, the sheer volume and diversity of tracking data retrieved from the tracking tools has become increasingly difficult to manage. As a result, erroneous and contradictory data points from diverse tools make visualization and management of tracking data problematic.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
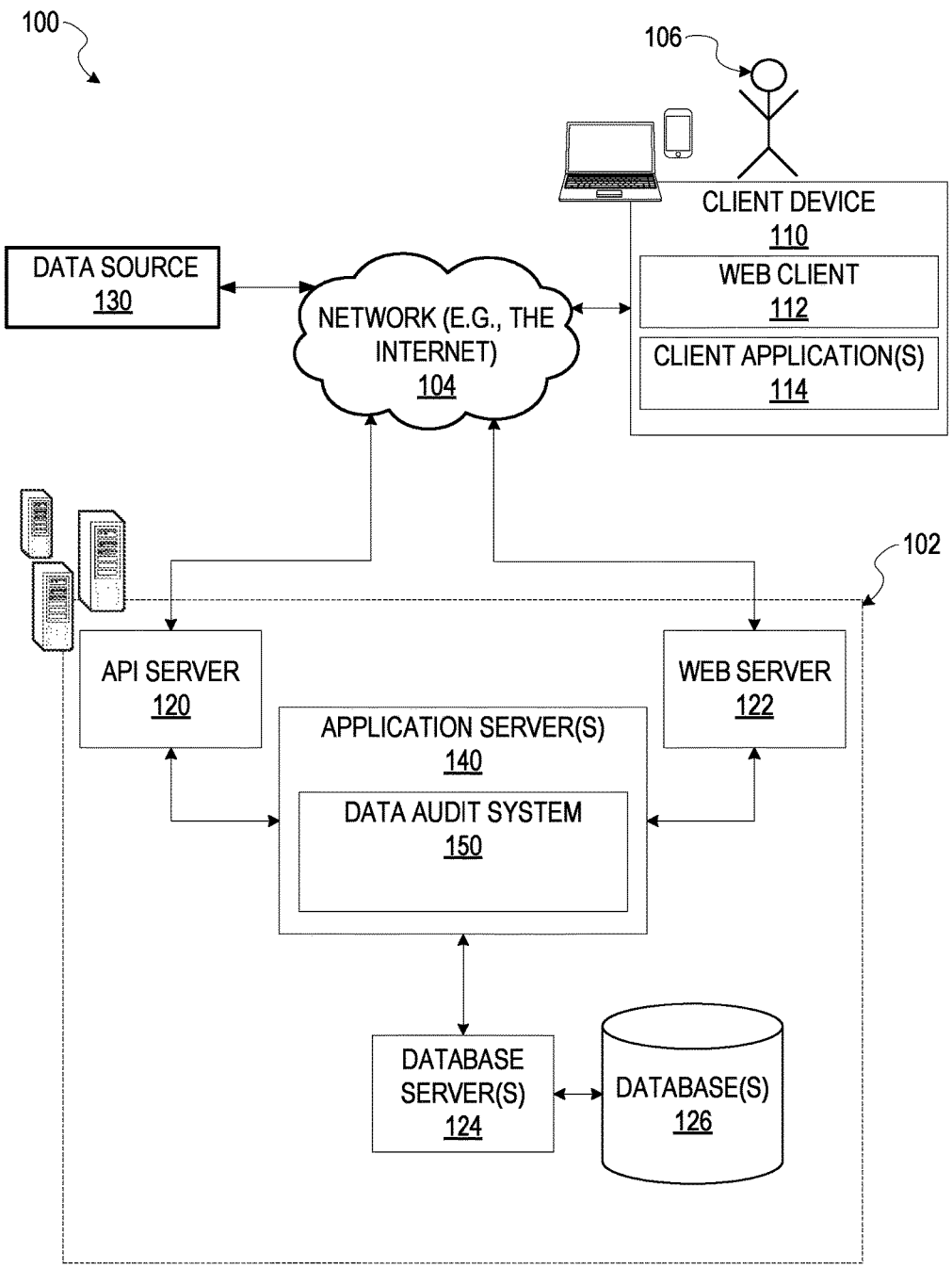
FIG. 1 is a network diagram depicting a network system comprising a group of application servers in communication with a network-based data audit system configured for generating and causing display of a visualization of tracking data, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Additional details regarding use cases can be found in U.S. patent application Ser. No. 15/082,307 entitled "INTERACTIVE MAP INTERFACE DEPICTING USER ACTIVITY," assigned to the assignee of the instant application, which application is hereby incorporated by reference in its entirety.

Example embodiments relate to a network-based data audit system, employed for accessing tracking data, presenting a visualization of the tracking data within a graphical user interface (GUI) at a client device, identifying patterns within the tracking data, and distinguishing anomalous data points within a presentation of the tracking data based on the patterns. "Tracking data," as used herein, may include data types ranging from static observation logs, cell phone data, vehicle tracking data, and beacon data, all of which may be collected and stored within a database. For example, static observation logs are composed of human-made observations on assets of interest from a static observation location. Static observation log data includes timestamps of the observations, as well as details pertaining to the asset observed. For example, the static observation logs may include customs manifests, and cargo logs. Beacon data is composed of data from beacon tracking devices associated with tracked assets. Beacon data captures timestamp data, as well as longitude and latitude of an asset at a given time.

The tracking data may therefore include data collected in real-time, as well as historical data stored within one or more databases. Tracking data includes geospatial coordinate information, as well as temporal data that indicates a time and date in which the data was gathered. In example embodiments, the tracking data is stored in network databases capable of being accessed by applications hosted by servers that share common access to the network databases. Anomalous data points include data points that are new and inconsistent and/or contradictory when compared to existing patterns within the tracking data.

Aspects of the present disclosure involve a data audit system to generate and cause display of a tracking interface at a client device. The tracking interface is configured to present tracking data retrieved from multiple sources. The audit system accesses a data source to retrieve tracking data that includes an associated asset identifier that identifies a subject of the tracking data (e.g., tracked assets such as: shipping container, devices, delivery vehicle, delivery person, event, or location), and links the retrieved tracking data to a data object at a database of the audit system based on the asset identifier. For example, the tracking data may comprise a single data point that includes a reference to a single entity (e.g., an identifier of a package, shipping container, person, vehicle, or device). The reference may include a filename, or other similar tag which may be designated by the data source, or in some example embodiments by the audit system itself. The audit system links the data point to a data object within a database based on the asset identifier.

In some example embodiments, the database comprises a set of data objects, and each data object within the set is associated with a unique asset identifier. In this way, tracking data accessed and retrieved by the audit system may be linked to corresponding data objects based on an asset identifier included within the tracking data.

The audit system is configured to receive a selection of one or more data objects from a user device, and in response to receiving the selection, generate and cause display of a tracking interface that includes a summarization of the tracking data linked to the data objects. The summarization may include graphical windows configured to display details of the tracking data linked to the selected data objects. For example, the graphical windows may include a presentation of an asset identifier, a data type of the tracking data, a date or time associated with the tracking data (e.g., last update, time of retrieval), and an indication of other asset identifiers indicated within the tracking data.

A user of the audit system may provide a selection of one or more of the graphical windows through appropriate interaction with the tracking interface (e.g., a mouse click), and in response, the audit system generates a visualization of the tracking data linked to the selected data objects. The audit system identifies a pattern associated with a subject (e.g., an individual, an asset, a device, a vehicle, etc.) identified by an asset identifier of the tracking data. For example, the pattern may indicate that a subject of the tracking data regularly visits particular locations at specific times of a day (e.g., based on vehicle tracker, beacon, and/or cell phone data), or conducts activity with other subject(s) at particular locations or specific times of day (e.g., based on cell phone data, network data and/or observational logs). The audit system assigns those patterns to the data objects associated with the asset identifier of the subjects, for example by linking a record of the pattern to the data object within a database.

The audit system identifies anomalous data points based on the identified patterns. The anomalous data points include data points that are new (e.g., never before seen), inconsistent (e.g., outside of regular patterns), and/or contradictory (e.g., contrary to existing data points). For example, a pattern associated with an asset identifier may include a set of data points indicating coordinates, and associates of the subject (e.g., based on references to asset identifiers). An anomalous data point may correspond to coordinates of a location that have previously not been visited by the subject (e.g., coordinates not present in previous tracking data associated with the asset identifier), and in some instances, a new associate of the subject (e.g., asset identifiers) who was not previously referenced within the tracking data of the subject. In response to identifying the anomalous data points, the audit system visually distinguishes the anomalous data points from the visualization of the tracking data (e.g., by distinct color or pattern).

The audit system may receive a request from a user to overlay tracking data upon a visualization generated by the audit system. For example, a user may select a first set of graphical windows representing data objects, and in response, the audit system generates a first visualization of the first set of tracking data linked to the selected data objects in a single visualization interface. To overlay a second visualization of a second set of tracking data, the user may provide a selection of a second set of graphical windows. In response, the audit system causes display of a second visualization of the second set of tracking data over the first visualization. In some example embodiments, the overlaid tracking data may be visually distinguished from the first set of tracking data (e.g., based on a predefined color or graphical element).

The audit system is configured to identify relationships between data objects based on the linked tracking data. For example, the linked tracking data of a first data object of a first asset identifier may include a reference to a second asset identifier. The audit system generates and presents a notification within the tracking interface indicating the relationship between the data objects. A user of the audit system may provide inputs to indicate relationships between data objects, and set alerts to provide notifications when tracking data from a first data source includes a reference to an indicated data object. For example, the user may provide input to indicate that a notification be displayed any time tracking data from a first data source includes any reference to a data object of a second data source.

FIG. 1 is a network diagram illustrating a network environment 100 suitable for operating a data audit system 150. A networked system 102 provides server-side functionality, via a network 104 (e.g., an intranet, the Internet or a Wide Area Network (WAN)), to one or more clients such as the client device 110, and data source 130. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the data audit system 150. The application servers 140 are, in turn, shown to be coupled to one or more database servers 124 that facilitate access to one or more databases 126.

The data audit system 150 facilitates the accessing of tracking data, presenting a visualization of the tracking data within a graphical user interface (GUI) at a client device, identifying patterns within the tracking data, and distinguishing anomalous data within the visualization of the tracking data based on the patterns. For example, the data audit system 150 is configured to access the data source(s) 130 to retrieve tracking data, link the tracking data to a database (e.g., database 126), and generate and cause display of a GUI at the client device 110, based on the retrieved tracking data. The data source(s) may be or include a database (e.g., similar to database 126).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the presentation platform 102.

Figure 2:
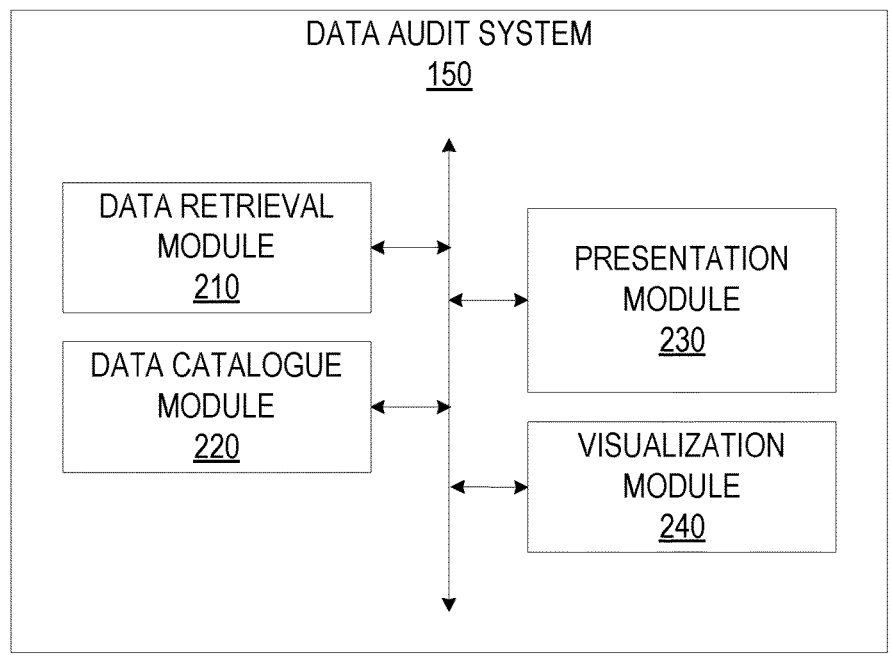
FIG. 2 is a block diagram illustrating various components of the data audit system, which is provided as part of the network system, consistent with some embodiments.

FIG. 2 is a block diagram illustrating an exemplary embodiment of the various components of the data audit system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the audit system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the audit system 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The data audit system 150 is shown as including a data retrieval module 210, a data catalogue module 220, a presentation module 230, and a visualization module 240, all configured to communicate with each other (e.g., via a bus, shared memory, a switch, or application programming interfaces (APIs)).

The data retrieval module 210 facilitates the access and retrieval of tracking data from various data sources (e.g., data source 130). The data source 130 may include a database that includes real-time as well as historical tracking data. The tracking data comprises one or more data points that include an asset identifier indicating a subject (e.g., a tracked asset, device, person, location, or vehicle) of the tracking data. For example, the tracking data may include observational logs, graphical images and videos, location coordinates, and cell phone data (e.g., geolocation data, call duration, call recipient, caller identification, etc.). The data retrieval module 210 provides the retrieved tracking data to the data catalogue module 220.

The data catalogue module 220 receives the tracking data from the data retrieval module 210, and indexes the tracking data within the database 126. The data catalogue module 220 may catalogue the tracking data based on the data source itself, or in some instances, based on the associated asset identifier of the tracking data. Thus, as the data catalogue module 220 receives tracking data, the data catalogue module 220 links the received tracking data to a data object within the database 126. Data linking is a process by which to connect related data that was not previously linked. In this way, the tracking data may be associated with a data object located within the database 126, and referenced at a later time based on the linking.

In some example embodiments, in addition to linking the tracking data to a data object within the database 126, the data objects themselves may be linked to one another based on tracking data. For example, tracking data may include a reference to multiple data objects (e.g., asset identifiers). Based on these references, the data catalogue module 220 links the data objects themselves within the database 126.

The presentation module 230 generates and causes display of GUIs at the client device 110. The GUIs include a tracking interface configured to present details of tracking data linked to one or more data objects of the database 126. A user (e.g., user 106) of client device 110 may provide inputs selecting one or more data objects of the database 126 to display within the tracking interface. For example, the user 106 may select a desired data source (e.g., data source 130), or asset identifier, and based on the selection, the presentation module 230 selects and presents graphical windows associated with the selections.

The visualization module 240 is configured to receive a visualization request, and generate a visualization of the tracking data linked to the data objects of the database 126 in response to receiving the visualization request. The visualization of the tracking data may include a map image with graphical elements representative of the data points at locations within the map image corresponding to coordinates identified by the tracking data. In response to receiving a selection of a graphical element, the visualization module 240 causes display of a display menu within the GUI that includes a list of tracking data associated with the data object corresponding to the selected data point. The list may comprise identifiers of data points of the tracking data, with icons indicating a data type (e.g., cell phone data, network data, beacon data, observational log). In response to a user selection of a data point from among the list of data points within the window, the visualization module 240 displays a visualization corresponding to the selection. For example, the selected data point may comprise observational logs that include temporal data. The visualization module 240 generates a visualization based on the selection, and displays times and dates which the observation data was gathered. In some example embodiments, a user may additionally select a visualization type (e.g., graph, chart).

The visualization module 240 is configured to receive a visualization request that includes a selection of one or more data objects (e.g., based on a selection of graphical windows associated with the data objects). In response to receiving the visualization request, the visualization module 240 accesses the selected data objects and retrieves the linked tracking data to generate and cause display of the visualization. To generate the visualization of the one or more data objects, the visualization module 240 causes display of the tracking data of each data object within a single visualization interface.

In some example embodiments, the visualization module 240 identifies patterns within the tracking data associated with an asset identifier based on the visualization and statistical analysis techniques. The visualization module 240 may generate an indication of the pattern, for example, by highlighting data points of data points of the identified pattern, or by causing display of a pop-up window which indicates a repeat occurrence of a data point within the tracking data. The statistical analysis may include pattern recognition algorithms and techniques. The visualization module 240 identifies anomalous data points based on the visualization, and distinguishes the anomalous data points from the data points of the pattern.

Figure 3:
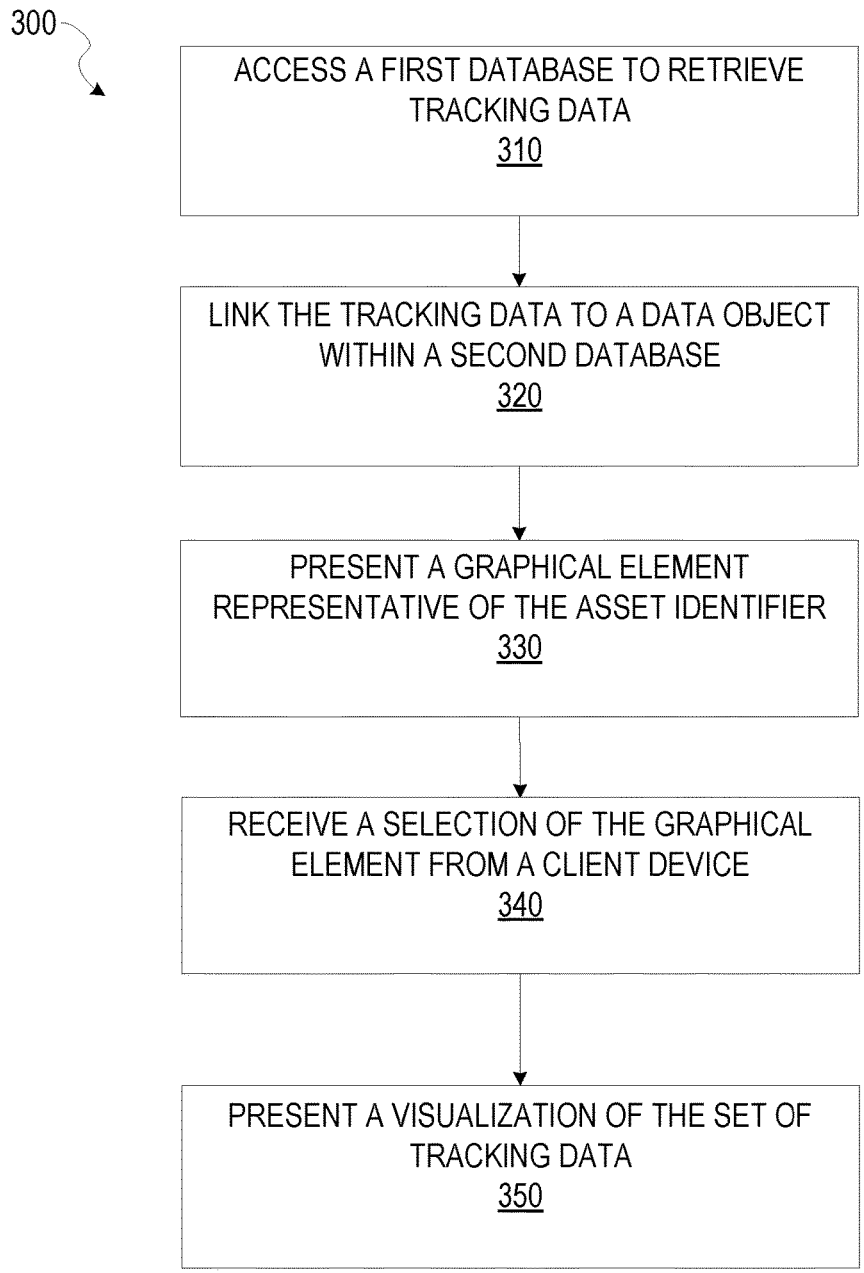
FIG. 3 is a flowchart illustrating a method for presenting a visualization of tracking data, according to some example embodiments.

FIG. 3 is a flow-chart illustrating a method 300 for generating and causing display of a visualization of tracking data within a GUI at a client device 110. The method 300 is embodied in computer-readable instructions for execution by one or more processors such that the operations of the method 300 are performed in part or in whole by the network-based data audit system 150; accordingly, the method 300 is described below by way of example with reference thereto. However, it shall be appreciated that at least some of the operations of the method 300 may be deployed on various other hardware configurations, and the method 300 is not intended to be limited to the network-based audit system 150.

At operation 310, the data retrieval module 210 accesses a data source (e.g., data source 130) to retrieve tracking data. The tracking data may include static observation logs, cell phone data, vehicle tracker data, and beacon data. The tracking data may be collected at intervals, in near real time, or from a database of the data source 130, similar to database 126. The tracking data includes an asset identifier indicating a person, event, or location associated with the tracking data.

At operation 320, the data catalogue module 220 links the retrieved tracking data to a data object within a database 126. In some example embodiments, the data catalogue module 220 links the tracking data to a data object associated with the data source (e.g., data source 130). In other example embodiments, the data catalogue module 220 links the tracking data to a data object associated with the asset identifier.

Figure 6:
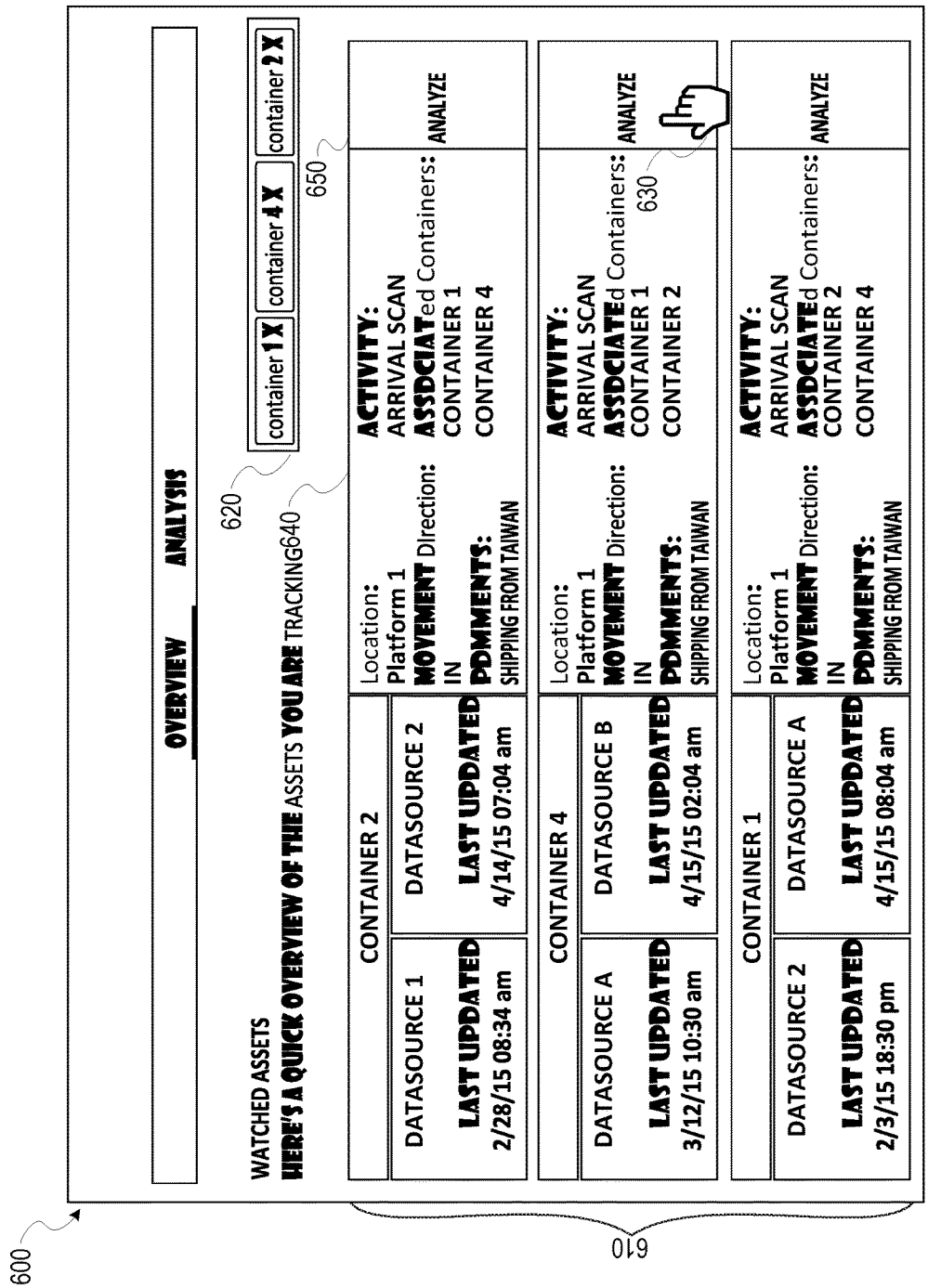
FIG. 6 is an interface diagram illustrating a portion of a graphical user interface depicting a visualization dashboard, consistent with some embodiments.

At operation 330, having linked the tracking data to the data object, the data catalogue module 220 causes display of a GUI at the client device 110. The GUI includes a tracking interface and one or more graphical windows representative of the tracking data linked to the data objects. The graphical windows may include, for example, an indication of the asset identifier of the data object, and a description of the tracking data linked to the data object (e.g., a time and date the tracking data was gathered, or user comments). In some example embodiments, the presentation module 230 is configured to receive a selection of one or more data objects, and in response, to cause display of graphical windows representative of the tracking data linked to the selected data objects. An example of the tracking interface is illustrated in FIG. 6 and discussed below, according to example embodiments.

At operation 340, the visualization module 240 receives a user selection of a graphical window displayed within the tracking interface, from a user 106 of the client device 110. In some instances, the user 106 may select more than one graphical windows, to compare the tracking data of the corresponding data objects associated with the graphical windows.

Figure 7:
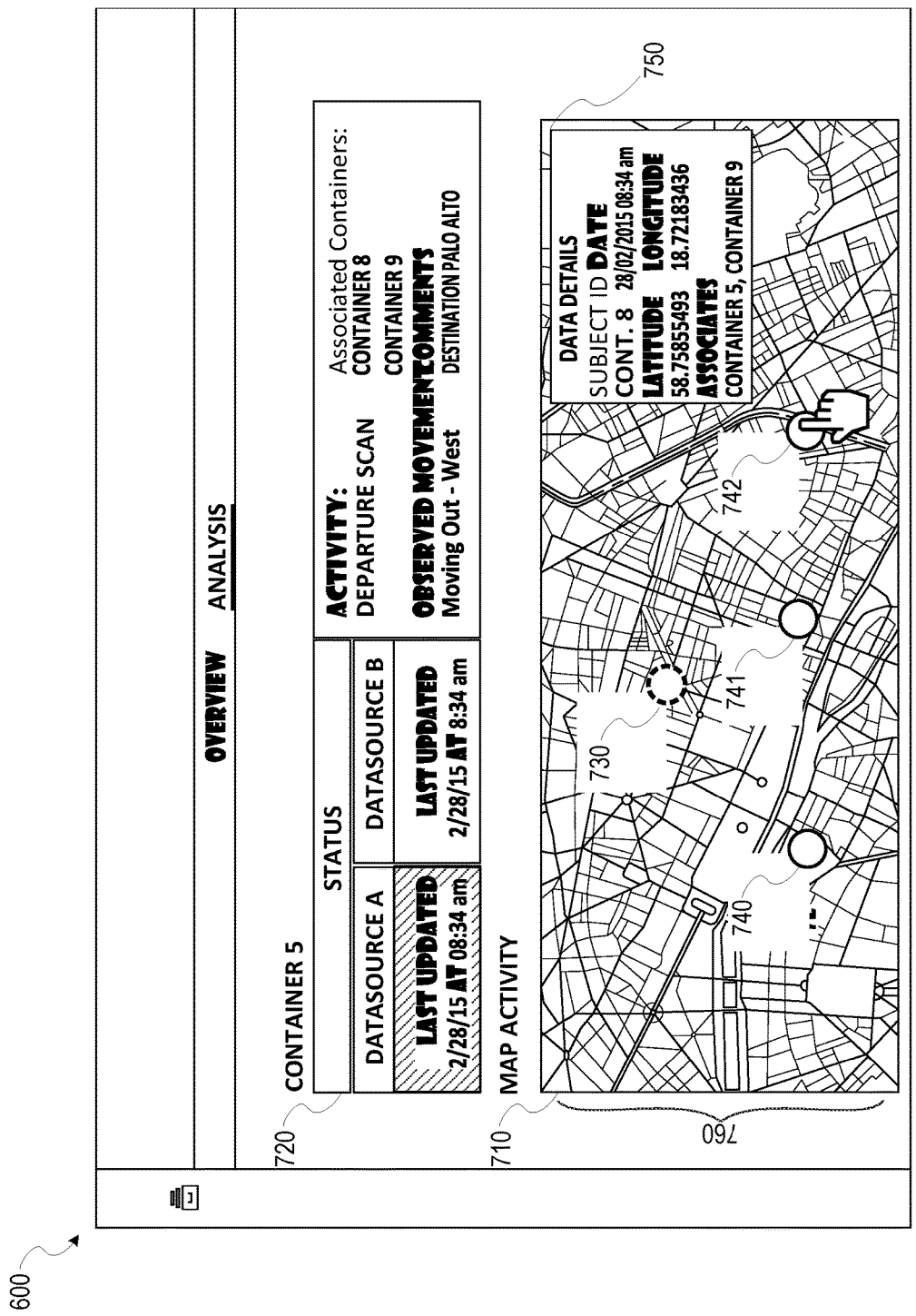
FIG. 7 is an interface diagram illustrating a portion of a graphical user interface depicting a visualization of tracking data, consistent with some embodiments.
Figure 8:
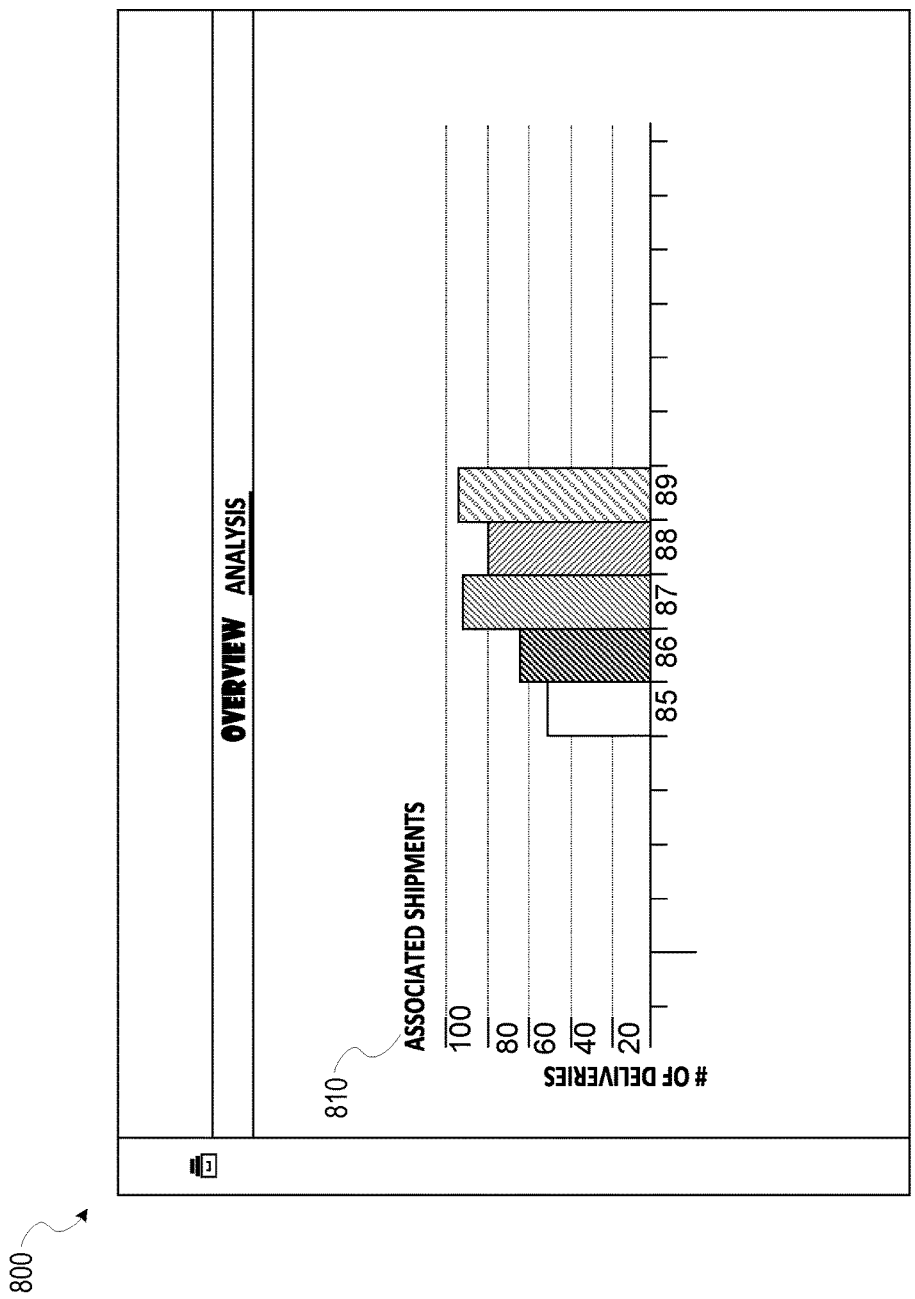
FIG. 8 is an interface diagram illustrating a portion of a graphical user interface depicting a visualization of tracking data, consistent with some embodiments.
Figure 9:
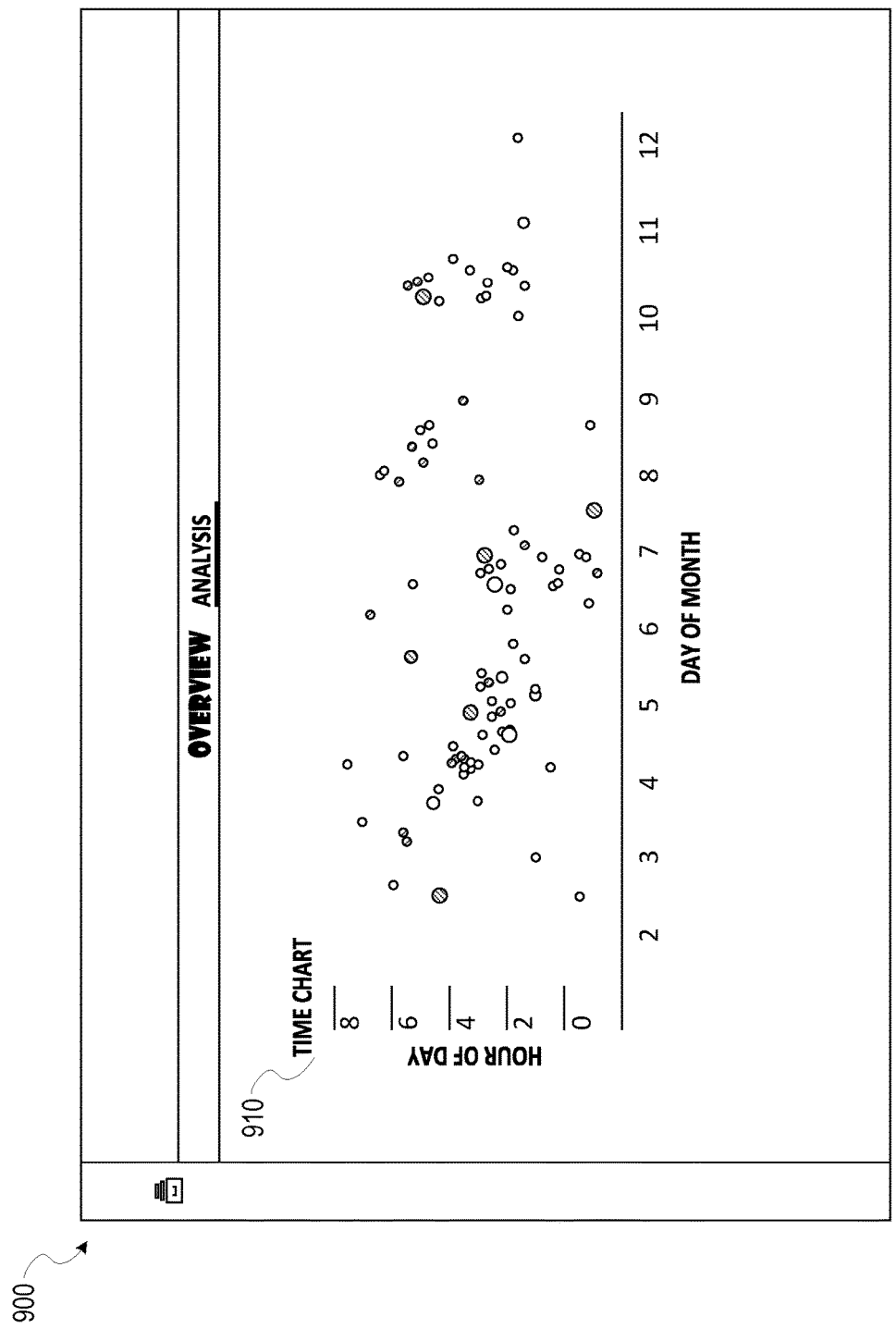
FIG. 9 is an interface diagram illustrating a portion of a graphical user interface depicting a visualization of tracking data, consistent with some embodiments.

At operation 350, in response to receiving the selection, the visualization module 240 generates and causes display of a visualization of the tracking data linked to the data objects of the selected graphical windows. An example of the visualizations generated by the visualization module 240 is illustrated in FIGS. 7-9 and discussed below, according to example embodiments.

Figure 4:
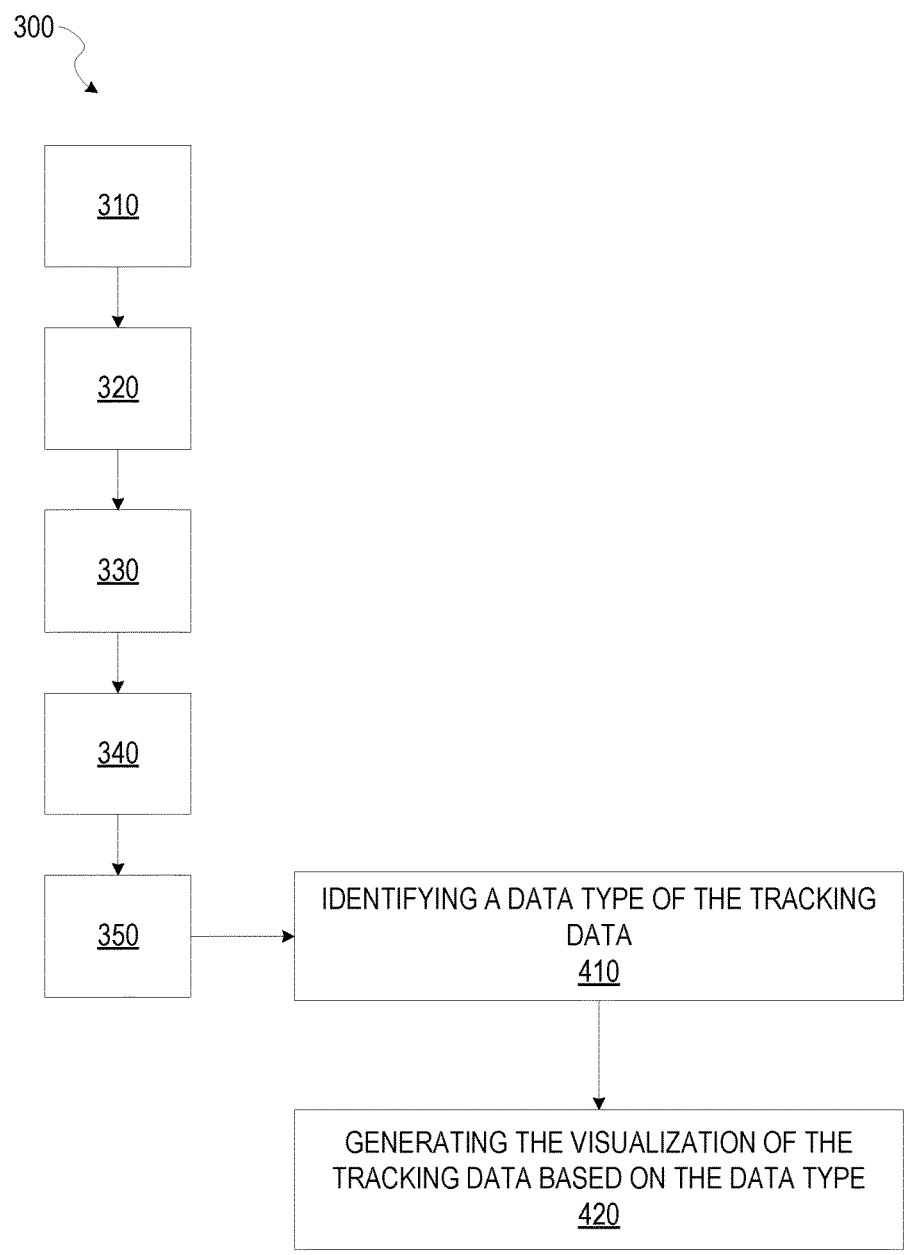
FIG. 4 is a flowchart, illustrating a method for presenting a visualization of tracking data, according to some example embodiments.

As shown in FIG. 4, one or more operations 410 and 420 may be performed as part (e.g., a precursor task, a subroutine, or a portion) of operation 350, in which the audit system 150 generates and causes display of a visualization of the tracking data linked to the data objects of the selected data points, according to some example embodiments.

At operation 410, in response to receiving the selection of the graphical window presented within the tracking interface, the visualization module 240 identifies a data type of the tracking data linked to the data object of the selected graphical window. For example, the data type of the tracking data may include any one of static observation logs, cell phone data, vehicle tracker data, network data or beacon data. The tracking data may additionally include geographic coordinates and temporal data.

At operation 420, the visualization module 240 generates and causes display of a visualization of the tracking data based on the data type. For example, each data type may have a corresponding visualization type (e.g., graph, chart, map, time chart). In some example embodiments, the visualization type may be defined based on user input. Having identified the data type of the tracking data, the visualization module 240 selects a visualization type based on the identified data type, and generates and causes display of a visualization.

Figure 5:
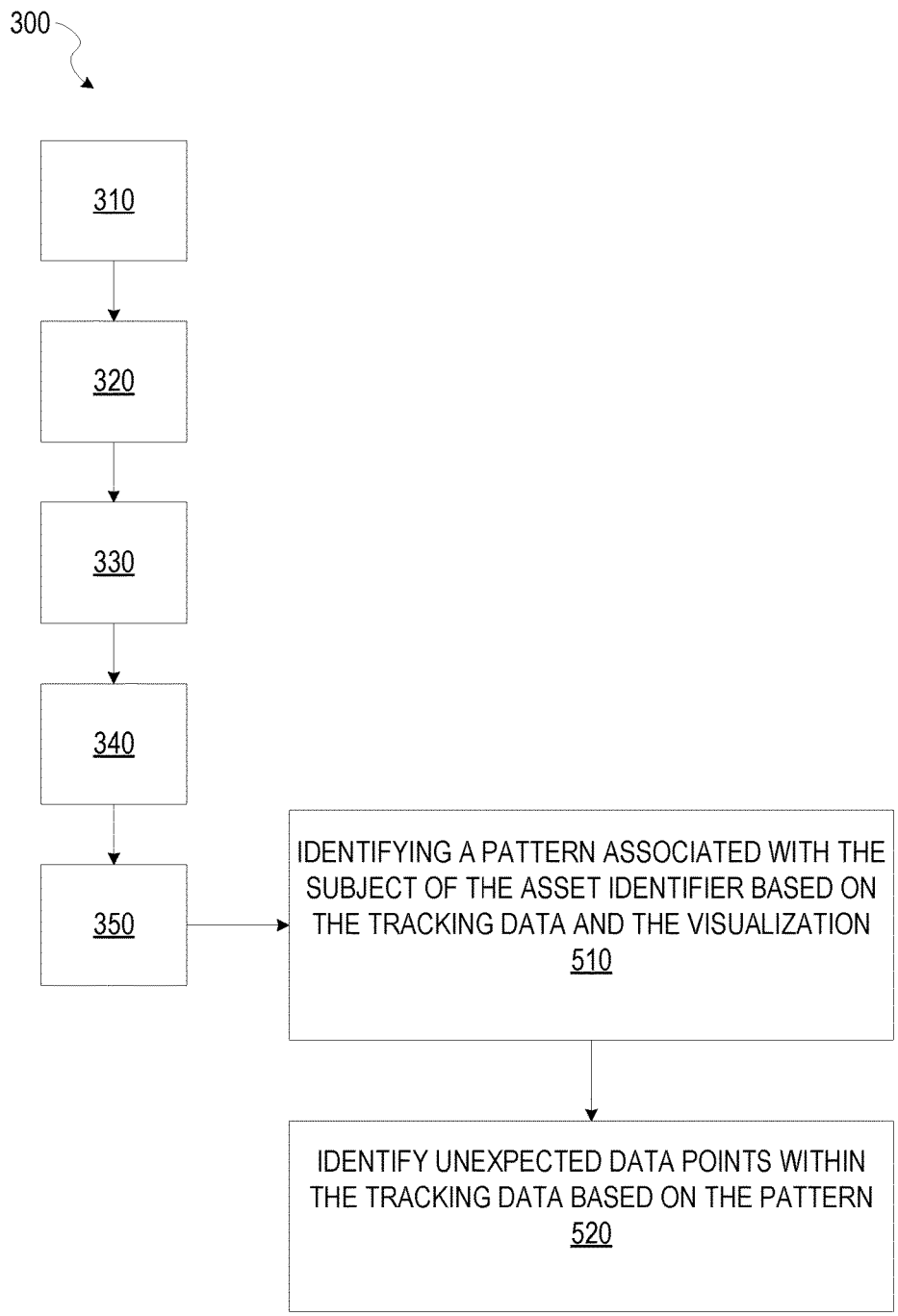
FIG. 5 is a flowchart, illustrating a method for identifying anomalous data points, consistent with some embodiments.

As shown in FIG. 5, one or more operations 510 and 520 may be performed as part (e.g., a precursor task, a subroutine, or a portion) of operation 350, in which the audit system 150 generates and causes display of a visualization of the tracking data linked to the data objects of the selected data points, according to some example embodiments.

At operation 510, the visualization module 240 identifies a pattern associated with the subject identified with the asset identifier corresponding to the tracking data of the visualization. For example, the pattern may be defined by an algorithm that calculates a frequency (e.g., a count) of a specific type of data point against a temporal measurement (e.g., day of week, hour of day, etc.). These are displayed as visualizations such as timelines, time-charts, heat-grids, as well as heat-maps. The pattern may include one or more data points that indicate repeat behavior of the subject. The repeat behavior may include being at a particular location based on coordinates at specific times or dates, conducting activity with the same associate(s) at specific times or dates, and from specific locations, as well as directions of travel, and even periods of inactivity based on the tracking data. Having identified the pattern, the visualization module 240 links the pattern to the asset identifier within the database 126.

At operation 520, the visualization module 240 analyses the tracking data and the visualization generated based on statistical analysis techniques, and in some example embodiments, identifies anomalous data points. Anomalous data points include: data points that reference new coordinates and activities previously unseen in the tracking data associated with the asset identifier; inconsistent data points that include tracking data indicating activity outside of the identified patterns; and contradictory data points that include tracking data contrary to existing data points.

Having identified the anomalous data points, the visualization module 240 visually distinguishes the anomalous data points from the tracking data. For example, the visualization module 240 may cause display of the anomalous data points in a distinct color or pattern. In some example embodiments, the visualization module 240 may additionally cause a graphical window that includes an indicator of a data source of the anomalous data point to be displayed in a predefined color or pattern to indicate that the data point from the data source include anomalous data points.

FIG. 6 is an interface diagram illustrating a GUI configured to display a tracking interface 600, for displaying graphical windows representative of tracking data accessed and retrieved by the audit system 150, according to some example embodiments. As shown, the tracking interface 600 includes a set of graphical windows 610, asset identifiers 620, a cursor 630, and tracking data information 640.

The tracking interface 600 may be presented by the presentation module 230 according to methodologies discussed in reference to FIG. 3. As shown in FIG. 6, the graphical windows 610 include an indication of a data source of the tracking data, an asset identifier of the tracking data, a date or time in which the tracking data corresponding to the asset identifier was last updated, and tracking data information 640. The tracking data information 640 may include details surrounding the linked tracking data. For example, as seen in FIG. 6, tracking data information 640 includes a display of a location corresponding to the tracking data, a type of activity documented by the tracking data, associates identified within the tracking data, and a direction of travel from the location (e.g., arrival, departure, southbound, etc.).

As shown in FIG. 6, the tracking interface 600 includes an analysis icon 650. The analysis icon 650 is configured to receive a user input (e.g., via a selection of the analysis icon 650 by the cursor 630), and in response to receiving the user input, causing the visualization module 240 to provide display of a visualization of the tracking data associated with the graphical window of the corresponding analysis icon 650.

In some instances, a user 106 of the client device 110 may opt to add or remove a graphical window from among the set of graphical windows 610 by selecting (or deselecting) a corresponding asset identifier 620. For example, the user 106 may remove a graphical window by providing a user input to delete an asset identifier from among the set of asset identifier 620 (e.g., selecting an "X" on the asset identifier). Alternatively, to add a graphical window to the tracking interface, the user 106 may provide a user input to add an asset identifier (e.g., selecting the "ADD" icon).

FIG. 7 is an interface diagram illustrating a visualization 710 of tracking data linked to a graphical window 720 within the tracking interface 600, according to the methodologies described in FIGS. 3-5. As shown in FIG. 6, the tracking interface 600 includes a graphical window 720, which was selected from among the set of graphical windows 610 of FIG. 6, and a visualization 710 of the tracking data linked to the data object corresponding to the graphical window 720. For example, a user 106 of a client device 110 may select the graphical window 650 with the cursor 630 of FIG. 6, and in response, the visualization module 240 generates and causes display of the visualization 720 and 710.

As shown in FIG. 7, the visualization 710 generated by the visualization module 240 includes a map image 760 and a set of data points (e.g., data point 730, data point 740) at locations on the map image 760 based on the linked tracking data. The location depicted by the map image 760 is selected by the visualization module 240 based on location data within the linked tracking data (e.g., coordinates in cell phone data, beacon data, and vehicle tracker data). For example, the visualization module 240 may identify coordinates from within the tracking data, and based on those coordinates retrieve a map image (e.g., map image 760) to present the tracking data. The visualization 710 also includes a display of data details 750 that presents additional information about the tracking data displayed. For example, the data details 750 may include a presentation of coordinates, an asset identifier, associated assets identified within the tracking data (e.g., other asset identifiers referenced by the tracking data) and a date corresponding to the tracking data of the visualization 710 (e.g., a date the tracking data was gathered).

In some example embodiments, the visualization generated by the visualization module 240 conveys new or inconsistent data points within the tracking data based on colors and patterns. For example, the visualization 710 includes data points 740-742. Data points 740-742 are displayed in a matching color or pattern, to indicate that the data points are a part of a pattern associated with the asset identifier identified within the graphical window 720 (e.g., Container 5). Data point 730 represents an anomalous data point. The visualization module 240 causes display of data point 730 in a predefined color or pattern to indicate that data point 730 is an anomalous data point. The visualization module 240 may additionally cause an indication of the data source associated with the anomalous data pint 730 to be displayed in a predefined color or pattern (e.g., Datasource A). In some example embodiments, the data points 740-742 may be displayed in predefined colors or patterns to indicate an age based on a corresponding timestamp. For example, new data points may be displayed as the color green, while older data points may be displayed in shades of red. In some example embodiments, the color or pattern of any one data point among the data points 740-742 may vary relative to the corresponding timestamps. For example, a new data point may be the color white, and subsequent, older data points may be displayed in progressively darker shades of gray until ultimately reaching the final data point in the time series that may be displayed in the color black.

FIG. 8 is an interface diagram illustrating a visualization 800 of a set of data points linked to an asset identifier, according to some example embodiments. As shown in FIG. 8, the visualization 800 includes a graph 810. The graph 810 illustrates the number of observations of a subject identified by the asset identifier at locations (e.g., delivery locations) based on tracked shipments referenced within the tracking data linked to the data object of the asset identifier (e.g., based on the appearance of the asset identifier of a tracked package).

FIG. 9 is an interface diagram illustrating a visualization 900 of a set of data points representative of a tracked asset, linked to an asset identifier, according to example embodiments. For example, the tracked asset may include a delivery vehicle, or shipping container. As shown in FIG. 9, the visualization 900 includes a presentation of a time chart 910 configured to display data points based on temporal data. For example, the time chart 910 of FIG. 9 illustrates a concentration of data points received based on the hour and day that the data point was received (e.g., arrival at a delivery). The visualization 900 conveys a snapshot of when the set of data points has the highest/lowest volume of activity.

Figure 10:
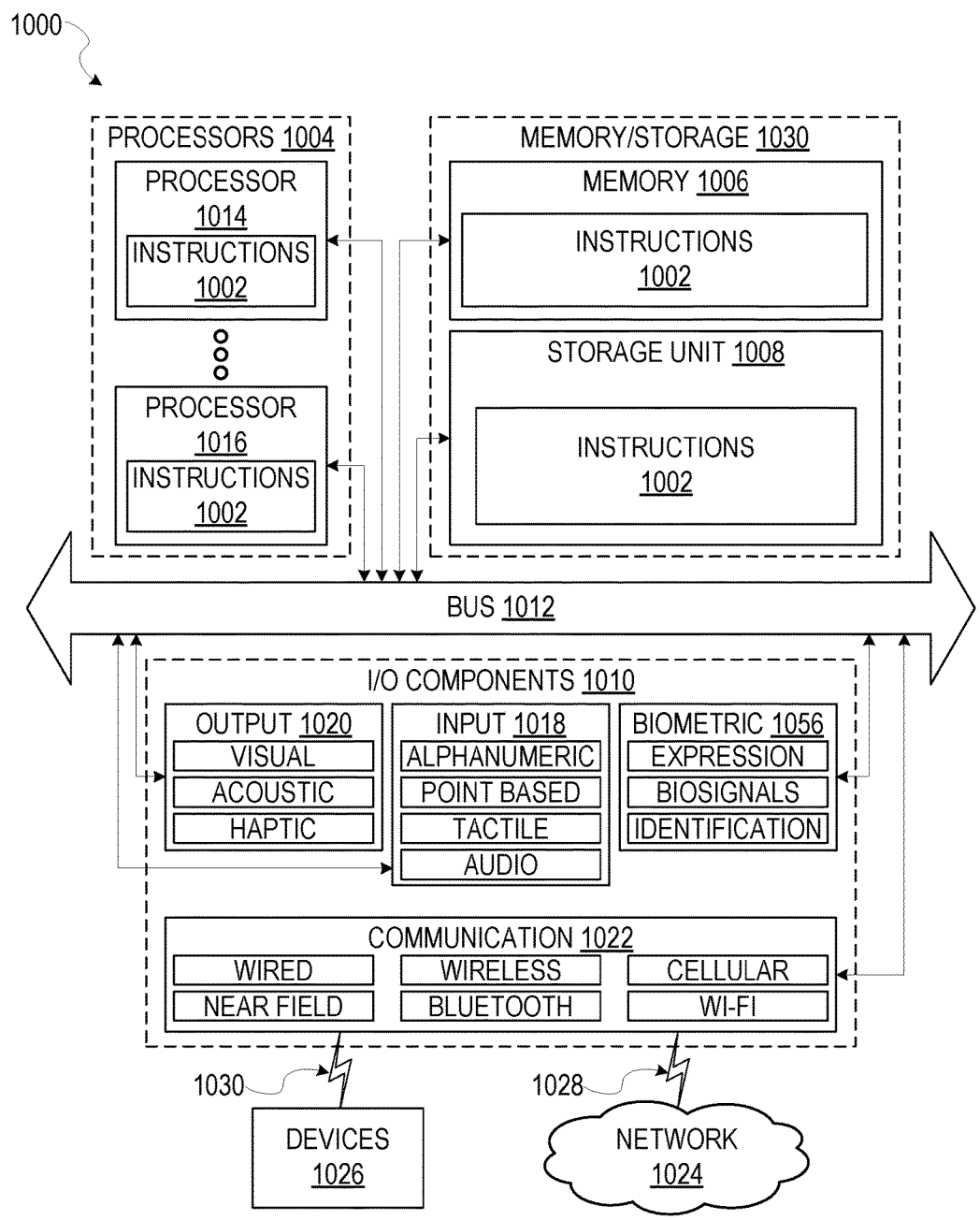
FIG. 10 is a diagrammatic representation of a machine in the example form of a computer system within which a set of instructions for causing the machine to perform any one or more of the methodologies discussed herein may be executed.

FIG. 10 is a diagrammatic representation of a machine in the example form of a computer system within which a set of instructions for causing the machine to perform any one or more of the methodologies discussed herein may be executed. Specifically, FIG. 10 shows a diagrammatic representation of the machine 1000 in the example form of a system, within which instructions 1002 (e.g., software, a program, an application, an applet, an app, a driver, or other executable code) for causing the machine 1000 to perform any one or more of the methodologies discussed herein may be executed. For example, the instructions 1002 include executable code that causes the machine 1000 to execute the methods 400 and 500. In this way, these instructions 1002 transform the general, non-programmed machine into a particular machine programmed to carry out the described and illustrated functions in the manner described herein. The machine 1000 may operate as a standalone device or may be coupled (e.g., networked) to other machines.

By way of non-limiting example, the machine 1000 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1002, sequentially or otherwise, that specify actions to be taken by machine 1000. Further, while only a single machine 1000 is illustrated, the term "machine" shall also be taken to include a collection of machines 1000 that individually or jointly execute the instructions 1002 to perform any one or more of the methodologies discussed herein.

The machine 1000 may include processors 1004, memory 1006, storage unit 1008 and I/O components 1010, which may be configured to communicate with each other such as via a bus 1012. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1014 and processor 1016 that may execute instructions 1002. The term "processor" is intended to include multi-core processors that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1006 (e.g., a main memory or other memory storage) and the storage unit 1008 are both accessible to the processors 1004 such as via the bus 1012. The memory 1006 and the storage unit 1008 store the instructions 1002 embodying any one or more of the methodologies or functions described herein. In some embodiments, the databases 126 resides on the storage unit 1008. The instructions 1002 may also reside, completely or partially, within the memory 1006, within the storage unit 1008, within at least one of the processors 1004 (e.g., within the processor's cache memory), or any suitable combination thereof, during execution thereof by the machine 1000. Accordingly, the memory 1006, the storage unit 1008, and the memory of processors 1004 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions (e.g., instructions 1002) for execution by a machine (e.g., machine 1000), such that the instructions, when executed by one or more processors of the machine 1000 (e.g., processors 1004), cause the machine 1000 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1010 may include a wide variety of components to receive input, provide output, produce output, transmit information, exchange information, capture measurements, and so on. The specific I/O components 1010 that are included in a particular machine will depend on the type of machine. For example, portable machines such as mobile phones will likely include a touch input device or other such input mechanisms, while a headless server machine will likely not include such a touch input device. It will be appreciated that the I/O components 1010 may include many other components that are not specifically shown in FIG. 10. The I/O components 1010 are grouped according to functionality merely for simplifying the following discussion and the grouping is in no way limiting. In various example embodiments, the I/O components 1010 may include input components 1018 and output components 1020. The input components 1018 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1010 may include communication components 1022 operable to couple the machine 1000 to a network 1024 or devices 1026 via coupling 1028 and coupling 1030, respectively. For example, the communication components 1022 may include a network interface component or other suitable device to interface with the network 1024. In further examples, communication components 1022 may include wired communication components, wireless communication components, cellular communication components, near field communication (NFC) components, Bluetooth® components (e.g., Bluetooth® Low Energy), WiFi® components, and other communication components to provide communication via other modalities. The devices 1026 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors of a machine; and
   a memory storing instructions that, when executed by at least one processor among the one or more processors, causes the machine to perform operations comprising:
   accessing a first database to retrieve tracking data that describes geographic locations of an asset, the tracking data including an asset identifier;
   storing the tracking data to a data object associated with the asset identifier, the data object being stored within a second database;
   causing display of a tracking interface that includes a graphical window;
   receiving a selection of the graphical window from a client device;
   determining a pattern within the tracking data associated with the asset identifier, the pattern including a set of data points indicating associations with data objects in the second database:
   identifying an anomalous data point from the pattern by determining the anomalous data point corresponds to another asset identifier of another data object that is outside the pattern: and
   causing display of a map visualization of the tracking data associated with the asset identifier in response to receiving the selection of the graphical window, the anomalous data point being visually distinguished from the remaining tracking data in the visualization.

2. The system of claim 1, the operations further comprising:
   linking, in the second database, the tracking data of the data object to the another data object.

3. The system of claim 1, wherein the anomalous data point is visually distinguished from the remaining set of tracking data in the map visualization using at least one of: different colors, different graphical elements.

4. The system of claim 1, the operations further comprising:
   accessing the first database to retrieve additional tracking data that describes additional geographic locations of another asset, the additional tracking data including the another asset identifier.

5. The system of claim 4, the operations further comprising:
   storing, in the second database, the additional tracking data as part of the another data object identified by the another asset identifier.

6. The system of claim 5, wherein displaying the map visualization includes overlaying the tracking data on the additional tracking data.

7. The system of claim 1, wherein the map visualization visually distinguishes newer data points from older data points in the tracking data.

8. A method comprising:
   accessing a first database to retrieve tracking data that describes geographic locations of an asset, the tracking data including an asset identifier;
   storing the tracking data to a data object associated with the asset identifier, the data object being stored within a second database;
   causing display of a tracking interface that includes a graphical window; receiving a selection of the graphical window from a client device; determining a pattern within the tracking data associated with the asset identifier, the pattern including a set of data points indicating associations with data objects in the second database;
   identifying an anomalous data point from the pattern by determining the anomalous data point corresponds to another asset identifier of another data object that is outside the pattern; and
   causing display of a map visualization of the tracking data associated with the asset identifier in response to receiving the selection of the graphical window, the anomalous data point being visually distinguished from the remaining tracking data in the visualization.

9. The method of claim 8, further comprising:
   linking, in the second database, the tracking data of the data object to the another data object.

10. The method of claim 8, wherein the anomalous data point is visually distinguished from the remaining set of tracking data in the map visualization using at least one of: different colors, different graphical elements.

11. The method of claim 8, further comprising:
   accessing the first database to retrieve additional tracking data that describes additional geographic locations of another asset, the additional tracking data including the another asset identifier.

12. The method of claim 11, further comprising:
   storing, in the second database, the additional tracking data as part of the another data object identified by the another asset identifier.

13. The method of claim 11, wherein displaying the map visualization includes overlaying the tracking data on the additional tracking data.

14. The method of claim 8, wherein the map visualization visually distinguishes newer data points from older data points in the tracking data.

15. A non-transitory machine-readable storage device embodying instructions that, when executed by a machine, cause the machine to perform operations comprising:
   accessing a first database to retrieve tracking data that describes geographic locations of an asset, the tracking data including an asset identifier;
   storing the tracking data to a data object associated with the asset identifier, the data object being stored within a second database;
   causing display of a tracking interface that includes a graphical window; receiving a selection of the graphical window from a client device; determining a pattern within the tracking data associated with the asset identifier, the pattern including a set of data points indicating associations with data objects in the second database;
   identifying an anomalous data point from the pattern by determining the anomalous data point corresponds to another asset identifier of another data object that is outside the pattern; and
   causing display of a map visualization of the tracking data associated with the asset identifier in response to receiving the selection of the graphical window, the anomalous data point being visually distinguished from the remaining tracking data in the visualization.

16. The machine-readable storage device of claim 15, further comprising:
   linking, in the second database, the tracking data of the data object to the another data object.

17. The machine-readable storage device of claim 15, wherein the anomalous data point is visually distinguished from the remaining set of tracking data in the map visualization using at least one of: different colors, different graphical elements.

18. The machine-readable storage device of claim 15, further comprising:
   accessing the first database to retrieve additional tracking data that describes additional geographic locations of another asset, the additional tracking data including the another asset identifier.

19. The machine-readable storage device of claim 18, further comprising:
   storing, in the second database, the additional tracking data as part of the another data object identified by the another asset identifier.

20. The machine-readable storage device of claim 18, wherein displaying the map visualization includes overlaying the tracking data on the additional tracking data.

* * * * *